United States Patent [19]

Steiner et al.

[11] Patent Number: 5,342,277
[45] Date of Patent: Aug. 30, 1994

[54] ROLL WITH SEPARATE SHELL AND ROLL CORE

[75] Inventors: Karl Steiner, Herbrechtingen; Uwe Matuschczyk, Geislingen, both of Fed. Rep. of Germany

[73] Assignee: J. M. Voith GmbH, Heidenheim, Fed. Rep. of Germany

[21] Appl. No.: 973,705

[22] Filed: Nov. 9, 1992

[30] Foreign Application Priority Data

Nov. 8, 1991 [DE] Fed. Rep. of Germany ....... 4136758

[51] Int. Cl.$^5$ .............................................. B21B 13/02
[52] U.S. Cl. ........................................ 492/56; 492/26; 492/47
[58] Field of Search ................. 492/26, 27, 30, 31, 492/32, 33, 34, 35, 45, 47, 56

[56] References Cited

U.S. PATENT DOCUMENTS

| | | | |
|---|---|---|---|
| 1,009,520 | 11/1911 | Hunt | 492/27 |
| 1,317,713 | 10/1919 | Linder | 492/27 |
| 1,428,760 | 9/1922 | Cuish, Jr. | 492/26 |
| 2,319,615 | 5/1943 | Luehrs | 492/31 |
| 3,374,648 | 3/1968 | Maguire | 492/35 |
| 3,599,306 | 8/1971 | Brafford | 492/30 |
| 3,886,622 | 6/1975 | Horst | 492/22 |
| 4,042,804 | 8/1977 | Moser | 492/27 |
| 4,253,392 | 3/1981 | Brandon et al. | 492/27 |
| 4,353,296 | 10/1982 | Beucker | 492/30 |
| 4,559,106 | 12/1985 | Skytträ et al. | 492/30 |
| 4,619,737 | 10/1986 | Holz | 492/32 |
| 4,625,376 | 12/1986 | Schiel et al. | 492/26 |
| 4,868,958 | 9/1989 | Suzuki et al. | 492/32 |
| 5,119,542 | 6/1992 | Küsters et al. | 492/47 |

*Primary Examiner*—Irene Cuda
*Attorney, Agent, or Firm*—Marshall, O'Toole, Gerstein, Murray & Borun

[57] ABSTRACT

A roll, especially for press rolls in paper machines includes an elastomeric shell separated from a roll core. The roll is characterized by the fact that, in the region of the axial end of the roll core, there is a large reduction in thickness of the roll shell, with the reduced thickness provided substantially at the axial end of the roll shell or in an annular transition region spaced from and near the end of the shell.

18 Claims, 2 Drawing Sheets

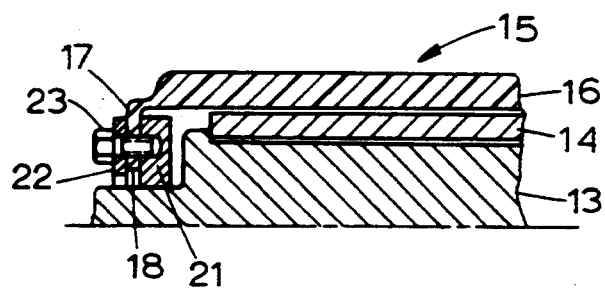
FIG. 1
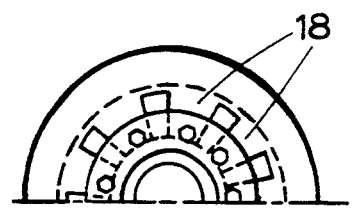
FIG. 2
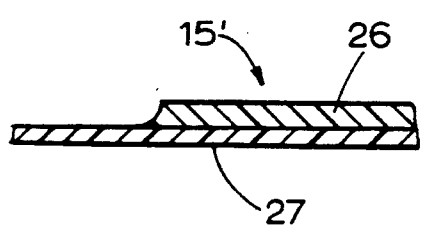
FIG. 3
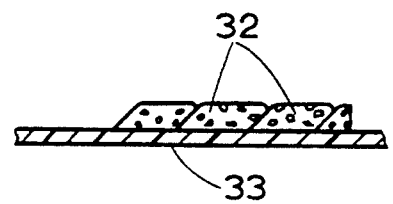
FIG. 4
FIG. 5
FIG. 6
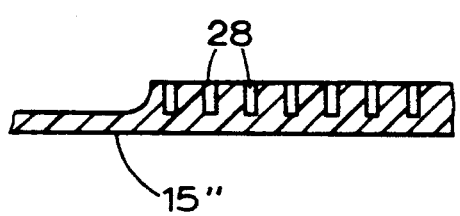
FIG. 9
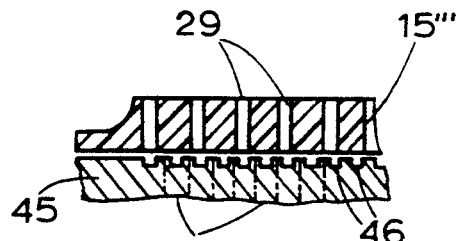
FIG. 8
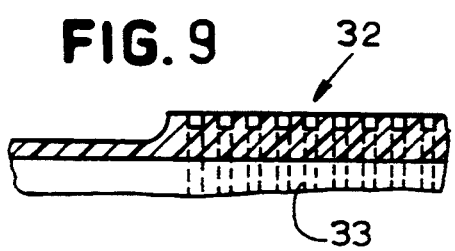
FIG. 10
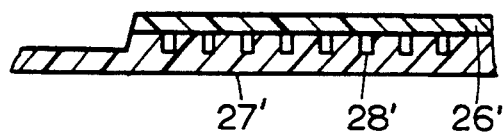
FIG. 11
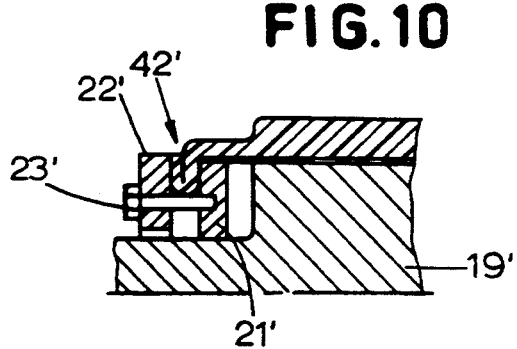

ROLL WITH SEPARATE SHELL AND ROLL CORE

The invention is directed to a roll of the type useful in press rolls for paper machines, with a roll shell separated from a roll core.

It is known that in the case of such rolls, the roll shell should lie tightly against the roll core, typically with the aid of radially acting tension devices. This presumes a rotating roll core. However, there are applications where there is a fixed roll core against which a roll shell is supported in the press section of the roll. Furthermore, it is also difficult to secure the roll shell on the roll core with the aid of radially acting tension devices.

One object of the invention is to provide simple means for securing the roll shell while enhancing the adaptability of the shell. This is accomplished by the use of a shell comprising an elastomeric material separated from the core and having substantially reduced thickness at the axial end of the shell or in an annular transition region closely spaced near the end.

By means of the invention, it is possible to provide roll shells which are thicker in the actual working region (press region) than in their axial end regions, so that the roll shell can be fastened relatively easily to the roll core or even to the roll mounting, and, in spite of this, to be able to have a variable adaptable design for the roll shell in order to fulfill certain requirements placed for the roll shell. In a preferred embodiment, no protrusions extend beyond the radial outer circumference of the roll sleeve.

The invention will be explained below with the aid of practical examples presented in the drawing figures. The following are shown:

FIG. 1 is an axial cross-section showing the principle of a roll according to the invention;

FIG. 2 is a front elevation of the roll of FIG. 1;

FIGS. 3 to 6, 8, 9 and 12 are axial cross-sections through roll shells according to the invention;

FIGS. 7, 10, 111, 14 and 15 are axial cross-sectional views of several embodiments of rolls according to the invention.

Figure 7:
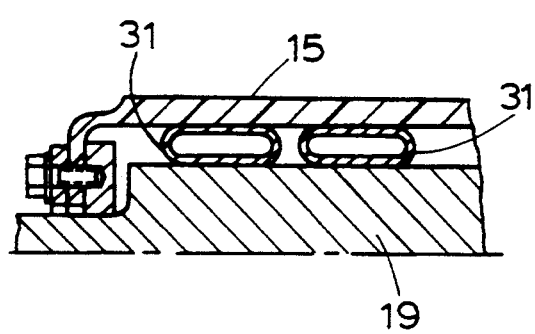

In FIG. 1, a longitudinal core 13 of a roll is shown with a lifting cylinder 14 that can be activated hydraulically or pneumatically in order to press a roll shell 15 against a counter roll in the region where it guides a moist paper web, optionally together with a felt or sieve. A rotating supporting ring 21 is provided at each end of the roll to rotatably hold the roll shell 15. The roll shell 15 has a relatively thick middle region 16 and relatively thin end regions 17, 18, which are preferably at least 2 mm thinner than the middle region 16. The thin end regions 17, 18 are fastened to a respective supporting ring 21 with the aid of a tension ring 22 and screws 23. As can be seen from FIG. 2, the thinner regions 17, 18 can be in the form of individual tongues 18 distributed uniformly around the periphery of the shell. Instead of a single tension ring 22, individual tension segments can be used.

The middle region of roll shell 15, which comprises natural or synthetic rubber or another synthetic elastomeric material, may have a thickness desired for its intended use because the clamping regions near the ends are designed to be relatively thin, and thus can easily be clamped tightly by the mounting device. Several alternative embodiments of the shell are shown in the figures.

FIG. 3 shows a shell 15', which consists essentially of upper and lower layers 26 and 27, respectively. The upper (or outer) layer 26, preferably made of synthetic elastomeric material, may be cast on the lower (or inner) layer 27, which is made of the same or similar synthetic material.

In FIG. 4, it is shown that one can apply caterpillar-shaped or herringbone covering layers 32 in the necessary thickness onto a base layer 33. In both FIGS. 3 and 4, the base layer is the one which forms the relatively thin end regions or tongues of the shell.

FIG. 5 shows a variation of a shell 15" made of synthetic material, which has blind holes 28 in its thicker middle region.

FIG. 6 shows a shell 15''' having through bores 29. This shell can also be combined with a rotating roll core 45 which has circumferential grooves 46 which form notches. In this case, there is a narrower gap between the ridged surface of the roll core 45 and the inner surface of shell 15''', so that in the pressing gap of the roll, the shell can be supported without any problem on the surface of the roll core. Water which is pressed out from the paper web to be treated is discharged through the grooves 46 away from the pressing region. Spiral grooves or suction bores 51 can be provided if the roll core is designed with a longitudinal (axial) through-bores, in order to discharge the water that was pressed out.

FIG. 8 shows a shell design in which an outer layer 26' is built onto an inner layer 27'. The inner layer 27' carries radial blind holes 28' on the radial outer surface thereof. In this way, very soft mechanical behavior can be imparted to the roll shell.

FIG. 9 shows a roll shell 32 of the invention in which circumferential grooves 33 are formed on the radially outer surface of the shell 32. As a result of this, the dewatering performance of a roll having such a roll shell can be improved.

FIG. 10 shows a different embodiment for fastening a roll shell according to the invention. A flanged shell end 42' or the corresponding end tongues are pressed tight between a supporting ring 21' and a tension ring 22' with the aid of screws 23'. The supporting ring 21' is carried by a roll core 19'

Yet another fastening device for a roll shell according to the invention is shown in FIG. 11, in which the shell 15 is secured on roll core 19" through a tension ring 36 and supporting ring 35 with a pressure tube or bellows 41 therebetween, to which pneumatic or hydraulic pressure can be applied.

FIG. 7 shows a supporting device for a roll shell 15 according to the invention, comprising hydraulic or pneumatic pressure tubes 31 disposed next to one another and which are pressed between the roll shell and the roll core 19. Preferably, during mounting, no internal pressure is applied in pressure tubes 31, so that the roll shell can be easily pushed over the roll core.

Many stable tubes can be provided corresponding to tubes 31, for example, with a diameter of 20 mm and a wall thickness between 3 and 5 mm, whereby the application of vacuum can facilitate mounting. After the vacuum is removed (that is, for example, by inflow or restoration of atmospheric pressure in the tubes), the tubes will assume their normal pressing force. This also can be achieved in the case of bellows 41 in FIG. 11.

Figure 12:
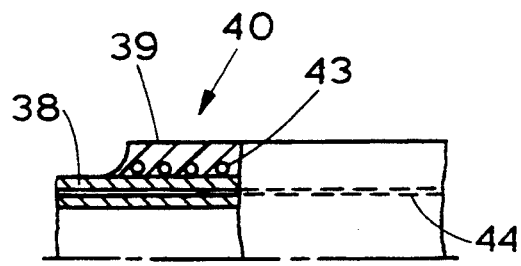

FIG. 12 shows a further embodiment of a shell 40 according to the invention, in which an inner layer 38 and a radially outer layer 39 are present and wherein the outer layer 39 has circumferential wires or very strong threads 43 and the inner layer has threads or wires 44 extending in the longitudinal direction. A variation of this can be achieved by having the thinner edge region having strong threads (or wires) of varying thicknesses and number, depending on the intended application, extending in the circumferential direction, as compared to the thicker middle region. Naturally, further variations are available to the expert according to the desired use.

Figure 14:
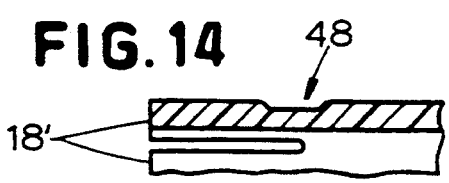

FIG. 14 shows that the area of the roll shell which has substantially the thinner wall thickness can be designed as an annular region 48 at a transition region to the end tongues 18' that serve for clamping.

Figure 15:
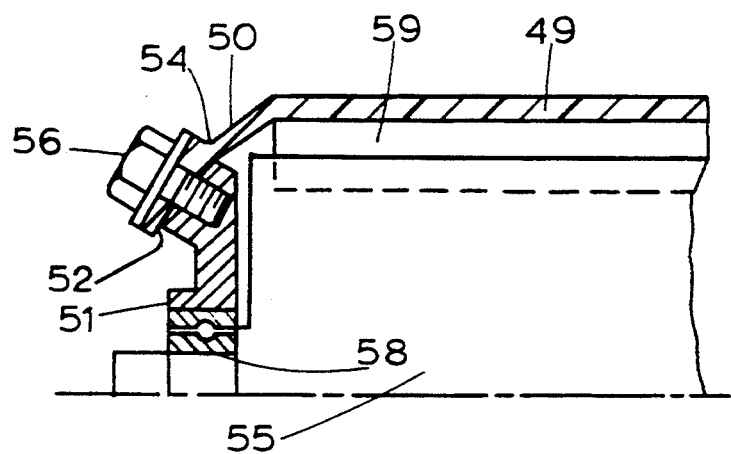

Referring to FIG. 15, a sleeve 49 is carried by a stationary yoke 55 by (or via) piston elements 59. The axial end portions of the sleeve 49 are flaps 50 of decreased thickness with regard to the rest of the sleeve 49 and are fastened by screws 56 to radially extending bearing plates 51 at rim surfaces 54 thereof, which are inclined to the longitudinal central axis of the roll by at least 40°, preferably about 60°. A flange-like fastening rim of the plate 51 is designated 52. In this way, no fastening parts protrude radially beyond the main, central portion of the sleeve 49. Roller bearings 58 are provided for rotation of end plates 51 and sleeve 49 on the yoke 55.

An aspect in the production of the roll shells of the invention can be that the thinner edge region will essentially be unworked and only the middle region is worked as, for example, to produce a smooth surface.

Furthermore, the shell according to the invention can also have circumferential grooves on the radially inner surface. In the case of a shell constructed of two layers, this would then be the (thinner) inner layer.

Figure 13:
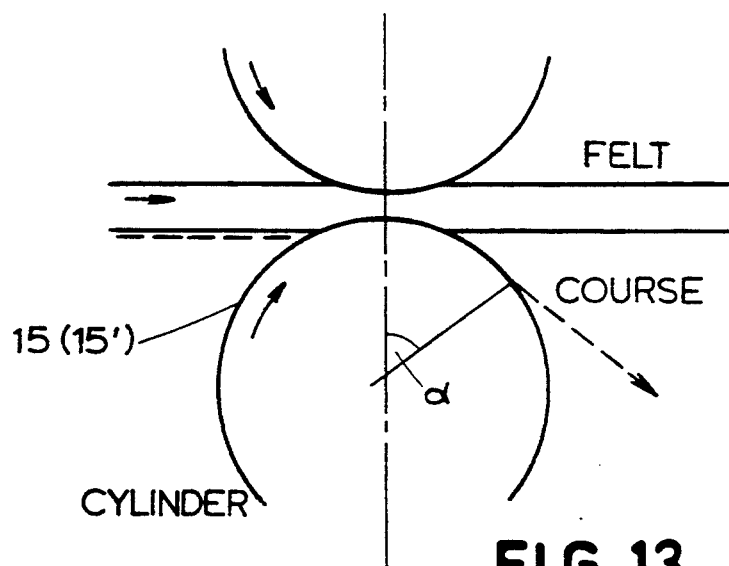
FIG. 13 shows the principle of a roll press using a roll according to the invention.

Furthermore, the shell according to the invention may have very fine grooves extending, for example, in the circumferential direction, whereby the grooves, for example, would have a depth between 0.03 and 0.2 mm and a width between 0.2 and 1.0 mm. The use of a roll shell constructed in this way is especially favorable for removal of the web from a press roll in roll presses. FIG. 13 shows an embodiment of this wherein, preferably, the grooves are not annular but round, especially on the radially outer surface, so that the shell surface assumes a certain wariness. As a result of this, after the press gap, the web will be carried only by the tips of the waves, so that the force necessary to remove the web from the press roll is reduced significantly. In addition, the removal angle at a is highly reduced.

The following embodiment can be considered for this:

1. The shell has a nonextensible layer, produced by a fabric or a set of threads at a distance between 0.3 to 2 mm from their radial outside surface of the shell.
2. This roll shell can also be used for a normal press unit of a double-felt press. The grooves that open up ensure additional removal of water from the felt.
3. The grooves can also be produced by overturning or working a smooth roll shell. Naturally, it is also possible to produce a roll shell in this way which is firmly bonded to a roll core as, for example, by vulcanization, or which is cast onto such a roll core.
4. The grooves can also be made in the paper machine itself, with a ductor having very fine teeth.

In general, the outer diameter difference of the roll shell and the thin end or annular regions is at least 2 mm and preferably more than 15 mm, although greater differences are possible.

We claim:

1. A roll comprising an axially extending roll core and an axially extending roll shell, said roll shell having axial ends and being formed of an elastomeric material and separated from the roll core, wherein the thickness of said roll shell is substantially reduced at the axial ends of the roll shell or at annular transition regions spaced from and near said axial ends of the roll shell, the substantial reduction in thickness provided in said roll shell being at least 2 mm.

2. The roll according to claim 1 wherein the roll shell exhibits a decrease in diameter at the radial outer surface at the axial ends.

3. The roll according to claim 2 wherein tongue-like regions are defined on the axial ends of the roll shell to accept fastening devices adapted to clamp said roll shell to said roll core.

4. The roll according to claim 1 wherein blind holes are defined in said roll shell.

5. The roll according to claim 4 wherein the roll core is adapted to rotate and is provided with circumferential grooves on a radial outer surface thereof and wherein bores are provided in the roll shell substantially in the region of the circumferential grooves of the roll core.

6. The roll according to claim 1 wherein radial through bores are defined in said roll shell.

7. The roll according to claim 1 wherein circumferential grooves are defined on an outer surface of the thicker region of said roll shell.

8. The roll of claim 7 wherein said grooves are helical.

9. The roll according to claim 1 wherein said roll shell comprises a radially inner first layer and a second layer applied thereto to define a relatively thick axially intermediate region, said second layer having a hardness or consistency which is different from that of said first layer.

10. The roll according to claim 9 wherein said first layer has blind holes and said second layer is fixed to the first layer without substantially penetrating into it.

11. The roll according to claim 9 wherein said first layer of the roll shell has longitudinal threads extending in the axial direction of the roll shell and the second layer fixed to the first layer has threads which extend circumferentially therethrough.

12. The roll according to claim 9 wherein the roll shell has herringbone shaped grooves on a radial outer surface, said grooves having a depth between 40 and 80 $\mu$m and a width between 0.3 and 0.8 mm.

13. The roll according to claim 1 wherein said roll core is rotatable and wherein said roll shell is disposed securely on the roll core by one of an annular supporting element and a ring-sector-shaped supporting element and with a bellows disposed between said supporting element and the rotatable roll core.

14. A roll comprising an axially extending roll core and an axially extending roll shell, said roll shell having axial ends and being formed of an elastomeric material and separated from the roll core, wherein the thickness of said roll shell is substantially reduced at the axial ends of the roll shell or at annular transition regions spaced from and near said axial ends of the roll shell, wherein said roll shell defines axially extending strips which are attached to one of a surface of the roll core and means which extend from a longitudinal axis of the roll core.

15. The roll according to claim 14 wherein said strips extend perpendicularly from said roll core.

16. The roll according to claim 14 wherein said strips are inclined at least 40° from said longitudinal axis, 17. The roll according to claim 14 wherein said means are one of axial end plates and rings.

18. The roll according to claim 1 wherein said roll shell is thinned at a radially outermost diameter thereof and defines axially extending flaps disposed at the circumference thereof.

* * * * *